United States Patent
Chiou

(10) Patent No.: US 12,550,289 B2
(45) Date of Patent: Feb. 10, 2026

(54) HEAT DISSIPATION MODULE

(71) Applicant: ASUSTeK COMPUTER INC., Taipei (TW)

(72) Inventor: Ing-Jer Chiou, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 154 days.

(21) Appl. No.: 18/479,115

(22) Filed: Oct. 2, 2023

(65) Prior Publication Data

US 2025/0040078 A1    Jan. 30, 2025

(30) Foreign Application Priority Data

Jul. 24, 2023  (TW) ................................. 112127468

(51) Int. Cl.
*H05K 7/20* (2006.01)
*G06F 1/20* (2006.01)

(52) U.S. Cl.
CPC ......... *H05K 7/20154* (2013.01); *G06F 1/203* (2013.01); *H05K 7/20336* (2013.01); *H05K 7/2039* (2013.01)

(58) Field of Classification Search
CPC ........... H05K 7/20154; H05K 7/20336; H05K 7/2039; G06F 1/023
USPC .................................................. 165/104.21
See application file for complete search history.

(56) References Cited

U.S. PATENT DOCUMENTS

| | | | | |
|---|---|---|---|---|
| 6,166,907 A * | 12/2000 | Chien | .................... | H01L 23/473 361/689 |
| 6,421,239 B1 * | 7/2002 | Huang | .................. | H01L 23/467 361/717 |
| 7,380,585 B2 * | 6/2008 | Liu | ........................ | H01L 23/427 165/122 |
| 7,775,262 B2 * | 8/2010 | Liu | ....................... | H01L 23/427 165/104.21 |
| 7,957,132 B2 * | 6/2011 | Fried | ........................ | G06F 1/20 361/694 |
| 8,016,024 B2 * | 9/2011 | Kang | .................. | F28D 15/0266 165/104.21 |

(Continued)

FOREIGN PATENT DOCUMENTS

| | | |
|---|---|---|
| CN | 2569345 | 8/2003 |
| CN | 1893799 | 1/2007 |

(Continued)

*Primary Examiner* — Claire E Rojohn, III
(74) *Attorney, Agent, or Firm* — JCIPRNET

(57) ABSTRACT

A heat dissipation module adapted for an electronic device with a fan is provided. The heat dissipation module includes a vapor chamber and a communicating pipe. The vapor chamber has a first cavity having an evaporating area and a second cavity communicated with the first cavity. The communicating pipe includes a first pipe and a second pipe communicated with the first pipe, wherein the first pipe is communicated with the first cavity, and the second pipe is communicated with the second cavity. An inner wall surface of the first pipe is a smooth surface, and an inner wall surface of the second pipe is provided with a wick structure. The first cavity, the second cavity and the communicating pipe surround and form a hollow area, wherein the fan is adapted for being disposed in the hollow area, and an air outlet of the fan faces the second pipe.

9 Claims, 4 Drawing Sheets

(56) References Cited

U.S. PATENT DOCUMENTS

| | | | | |
|---|---|---|---|---|
| 8,109,325 | B2* | 2/2012 | Kroliczek | F28D 15/043 29/890.032 |
| 8,262,263 | B2* | 9/2012 | Dinh | F21V 29/74 362/373 |
| 10,098,259 | B2* | 10/2018 | McLaughlin | F28F 3/046 |
| 10,969,838 | B2* | 4/2021 | He | G06F 1/203 |
| 11,320,876 | B1* | 5/2022 | North | G06F 1/166 |
| 11,877,381 | B2* | 1/2024 | Cheng | H05K 7/20172 |
| 11,892,239 | B2* | 2/2024 | Machida | F28D 15/046 |
| 12,150,280 | B2* | 11/2024 | Liu | H05K 7/20418 |
| 12,213,277 | B2* | 1/2025 | Cheng | H05K 7/2039 |
| 12,284,793 | B2* | 4/2025 | Bawa | H05K 7/20963 |
| 2003/0051859 | A1* | 3/2003 | Chesser | G06F 1/20 165/46 |
| 2009/0084525 | A1* | 4/2009 | Satou | G06F 1/20 165/104.21 |
| 2012/0024499 | A1* | 2/2012 | Chang | F28F 13/06 165/104.34 |
| 2012/0132402 | A1* | 5/2012 | Aoki | H05K 7/20809 165/104.21 |
| 2012/0230657 | A1* | 9/2012 | Uno | B60H 1/2221 165/104.21 |
| 2012/0280580 | A1* | 11/2012 | Tso | H02K 9/225 165/104.34 |
| 2012/0285663 | A1* | 11/2012 | Wu | F28D 15/046 165/104.21 |
| 2014/0054009 | A1* | 2/2014 | Chang | F28D 15/00 165/104.11 |
| 2014/0216692 | A1* | 8/2014 | Bretl | F28D 15/0233 165/104.21 |
| 2014/0290914 | A1* | 10/2014 | Chiou | F28D 15/0233 165/104.26 |
| 2015/0116928 | A1* | 4/2015 | Delano | F28D 15/0275 361/679.47 |
| 2015/0226492 | A1* | 8/2015 | Wu | F28F 1/24 165/104.21 |
| 2015/0354901 | A1* | 12/2015 | Moore | F28D 15/04 165/104.21 |
| 2016/0259383 | A1* | 9/2016 | Shioga | H01L 23/427 |
| 2018/0209745 | A1* | 7/2018 | Tsai | F28D 15/043 |
| 2018/0307283 | A1* | 10/2018 | Dupont | H05K 7/203 |
| 2019/0014687 | A1* | 1/2019 | Snyder | H05K 7/2039 |
| 2019/0050031 | A1* | 2/2019 | Utz | H05K 7/20327 |
| 2019/0203983 | A1* | 7/2019 | Jeon | F25B 21/02 |
| 2020/0386489 | A1* | 12/2020 | Baba | F28D 15/0266 |
| 2020/0396864 | A1* | 12/2020 | Ku | H05K 7/20309 |
| 2022/0065547 | A1* | 3/2022 | Haruki | H05K 7/20336 |
| 2022/0264741 | A1* | 8/2022 | Damaraju | G01S 7/027 |
| 2022/0295670 | A1* | 9/2022 | Endoh | H05K 7/20336 |
| 2022/0346273 | A1* | 10/2022 | Chen | G06F 1/182 |
| 2023/0030628 | A1* | 2/2023 | Chen | G06F 1/203 |
| 2023/0337406 | A1* | 10/2023 | Bawa | H01L 23/467 |
| 2025/0027726 | A1* | 1/2025 | Chiou | F28D 15/0266 |
| 2025/0040078 | A1* | 1/2025 | Chiou | G06F 1/203 |

FOREIGN PATENT DOCUMENTS

| | | |
|---|---|---|
| CN | 101943532 | 1/2011 |
| CN | 101453859 | 6/2011 |
| CN | 106954373 | 7/2017 |
| CN | 107664454 | 2/2018 |
| TW | M532142 | 11/2016 |

* cited by examiner

HEAT DISSIPATION MODULE

CROSS-REFERENCE TO RELATED APPLICATION

This application claims the priority benefit of Taiwan application serial no. 112127468, filed on Jul. 24, 2023. The entirety of the above-mentioned patent application is hereby incorporated by reference herein and made a part of this specification.

BACKGROUND

Technical Field

The application relates to a heat dissipation technology, and in particular, to a heat dissipation module.

Description of Related Art

With the improvement of the computing efficiency of the central processing unit or graphics processing unit in notebook computers, the central processing unit or graphics processing unit emits a large amount of heat during operation. In order to quickly dissipate heat, notebook computers are usually equipped with a fan, a heat pipe and a vapor chamber as a heat dissipation module.

In details, the vapor chamber is thermally coupled to a heat source, and the area in the vapor chamber that is in contact with or overlaps with the heat source as an evaporating area. When the evaporating area absorbs heat from the heat source, the liquid working fluid in the cavity of the vapor chamber evaporates into a gaseous working fluid, and flows to a relatively low temperature area outside the evaporating area. The gaseous working fluid is exothermically condensed into the liquid working fluid in the relatively low temperature area, and flows back to the evaporating area by capillary force.

On the other hand, the heat pipe includes an evaporating section and a condensing section, wherein the evaporating section is welded to the vapor chamber, and the condensing section is disposed corresponding to an air outlet of the fan. When the liquid working fluid in the evaporating section of the heat pipe absorbs the heat from the vapor chamber, the liquid working fluid evaporates into the gaseous working fluid and flows to the condensing section. The heat dissipation airflow blown from the air outlet of the fan is blown to the condensing section of the heat pipe, and exchanges heat with the gaseous working fluid in the condensing section. In this way, the gaseous working fluid is exothermically condensed into the liquid working fluid, and flows back to the evaporating section by capillary force.

Since the vapor chamber and the heat pipe are not communicated with each other, poor welding quality will cause the heat conduction efficiency between the vapor chamber and the heat pipe to decline. In addition, affected by the structural design of the heat pipe, it is difficult for the gaseous working fluid to flow to the far end of the condensing section. As a result, the heat is excessively concentrated at the proximal end of the condensing section (that is, the area close to the evaporating section), resulting in inefficient use of the heat pipe. Therefore, the common heat dissipation module composed of the fan, the heat pipe, and the vapor chamber has the problem of poor heat dissipation performance.

SUMMARY

A heat dissipation module adapted for an electronic device is provided. The electronic device has a fan with an air outlet. The heat dissipation module includes a vapor chamber and a communicating pipe. The vapor chamber has a first cavity and a second cavity communicated with the first cavity. The first cavity has an evaporating area, wherein a surface of the vapor chamber corresponding to a position of the evaporating area is thermally coupled to a heat source. The communicating pipe includes a first pipe and a second pipe communicated with the first pipe, wherein the first pipe is communicated with the first cavity, and an inner wall surface of the first pipe is a smooth surface. The second pipe is communicated with the second cavity, and an inner wall surface of the second pipe is provided with a wick structure. The first cavity, the second cavity and the communicating pipe surround and form a hollow area, wherein the fan is adapted for being disposed in the hollow area, and the air outlet faces the second pipe.

Based on the above, the vapor chamber can spread the heat outward from the evaporating area to prevent heat concentration. In addition, the vapor chamber can dissipate part of the heat to the communicating pipe and discharge it from the communicating pipe. Therefore, the heat dissipation module can accelerate the gas-liquid two-phase change process of the working fluid to improve heat dissipation performance.

DESCRIPTION OF THE EMBODIMENTS

Figure 1:
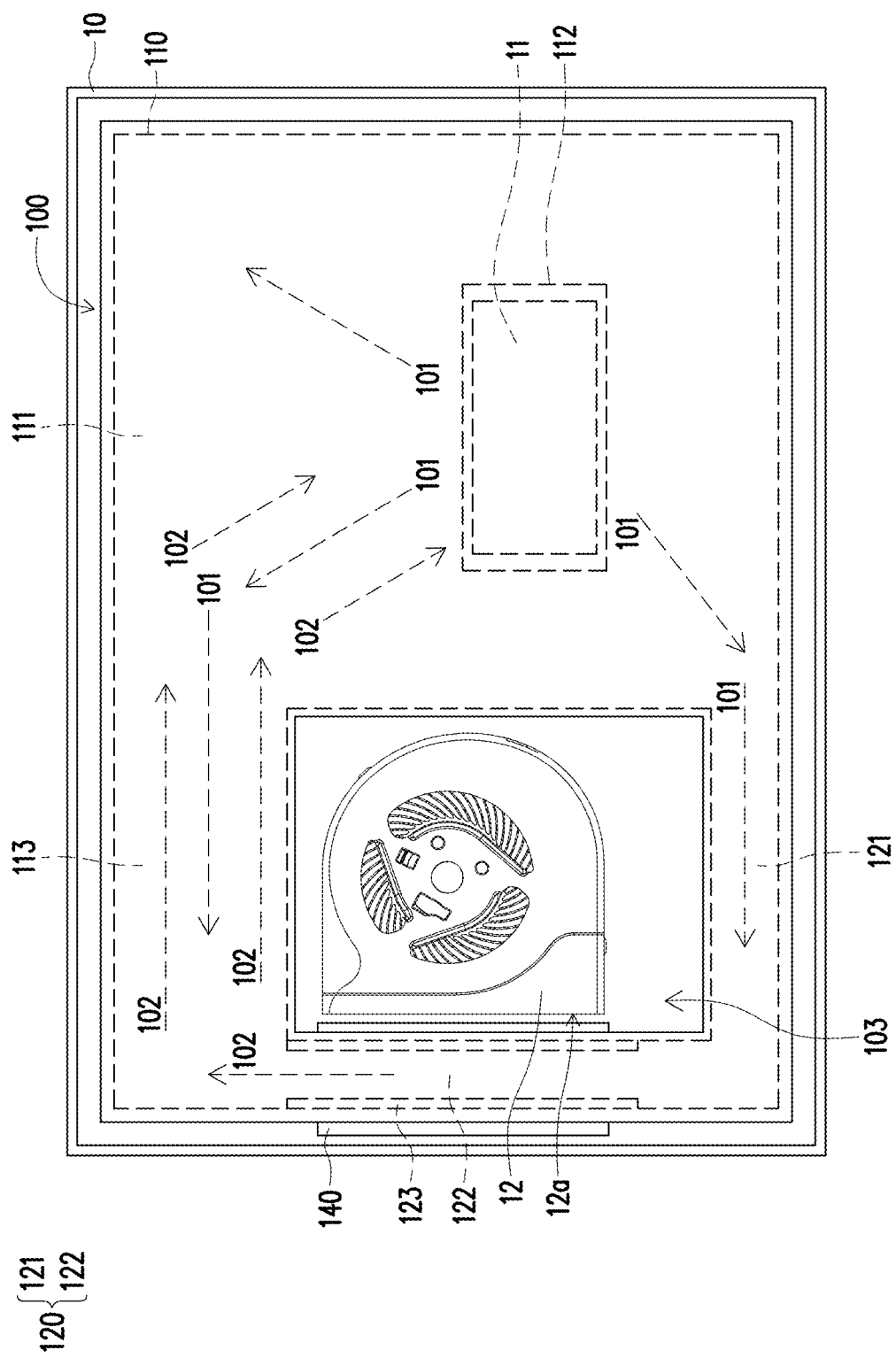
FIG. 1 is a schematic diagram of a heat dissipation module according to a first embodiment of the present invention.

FIG. 1 is a schematic diagram of a heat dissipation module according to a first embodiment of the present invention. Referring to FIG. 1, in the embodiment, the heat dissipation module 100 is disposed in an electronic device 10, and the electronic device 10 has a heat source 11 and a fan 12 inside. For example, the electronic device 10 can be a part of a notebook computer (such as a host with logic computing capability), but not limited thereto.

In details, the dissipation module 100 includes a vapor chamber 110 and a communicating pipe 120, wherein the vapor chamber 110 has a first cavity 111 and a second cavity 113, and the second cavity 113 is communicated with the first cavity 111. The first cavity 111 has an evaporating area 112, and a surface of the vapor chamber 110 corresponding to a position of the evaporating area 112 is thermally coupled to a heat source 11. For example, the heat source 11 can be a central processing unit or a graphics processing unit.

When the evaporating area 112 absorbs the heat from the heat source 11, a liquid working fluid 102 in the first cavity 111 of the vapor chamber 110 evaporates into a gaseous working fluid 101, and flows to a relatively low temperature area outside the evaporating area 112. On the other hand, the gaseous working fluid 101 exothermically condenses into the liquid working fluid 102 in a relatively low temperature area, and flows back to the evaporating area 112 by capillary force. For example, the second cavity 113 can be relatively low temperature area, the gaseous working fluid 101 can flow from the first cavity 111 to the second cavity 113 and is exothermically condensed into the liquid working fluid 102 in the second cavity 113, so as to flows back to the evaporating area 112 by capillary force.

As shown in FIG. 1, the communicating pipe 120 includes a first pipe 121 and a second pipe 122 communicated with the first pipe 121, wherein the first pipe 121 is communicated with the first cavity 111, and the second pipe 122 is communicated with the second cavity 113. In details, an inner wall surface of the first pipe 121 is a smooth surface, and an inner wall surface of the second pipe 122 is provided with a wick structure 123. For example, the communicating pipe 120 can be a hollow pipe welded to the vapor chamber 110 or a hollow pipe integrally formed on the vapor chamber 110.

The first pipe 121 is a steam delivery pipeline, and the second pipe 122 is a condensation pipeline. When the liquid working fluid 102 in the first cavity 111 of the vapor chamber 110 evaporates into the gaseous working fluid 101, the gaseous working fluid 101 can flow to the first pipe 121, and flow to the second pipe 122 via the first pipe 121. The gaseous working fluid 101 can be exothermically condensed into the liquid working fluid 102 in the second pipe 122, and the wick structure 123 can guide the liquid working fluid 102 to flow to the second cavity 113 and prevent the liquid working fluid 102 from flowing back to the first pipe 121. After the liquid working fluid 102 flows from the second pipe 122 into the second cavity 113, the liquid working fluid 102 can flow back to the evaporating area 112 by capillary force. That is to say, the working fluid can undergo a gas-liquid two-phase change in the communicating pipe 120 and maintain a one-way flow to improve heat dissipation efficiency.

In the embodiment, there is a first turning point between the second pipe 122 and the first pipe 121, and there is a second turning point between the second pipe 122 and the second cavity 113. For example, the second pipe 122 can be perpendicular to the first pipe 121 and the second cavity 113. In addition, the wick structure 123 can be distributed on the entire inner wall surface of the second pipe 122, or, the wick structure 123 can be distributed on a partial inner wall surface of the second pipe 122. For example, the inner wall surface of the second pipe 122 can be divided into a first part near the first turning point and a second part extending from the first part to the second turning point, wherein the first part can be the smooth surface, and the second part can be provided with the wick structure 123.

As shown in FIG. 1, the fan 12 can be a centrifugal fan, and is surrounded by the first cavity 111, the second cavity 113 and the communicating pipe 120. In details, an air outlet 12a of the fan 12 faces the second pipe 122. The heat dissipation airflow blown from the air outlet 12a of the fan 12 can be blown to the second pipe 122 and exchange heat with the gaseous working fluid 101, so that the gaseous working fluid 101 is exothermically condensed into the liquid working fluid 102 and flows to the second cavity 113 by capillary force.

In the embodiment, the second cavity 113 and the first pipe 121 are communicated with the same side of the first cavity 111, and the second pipe 122 is located between the second cavity 113 and the first pipe 121. Further, the first cavity 111, the first pipe 121, the second pipe 122 and the second cavity 113 can surround and form a hollow area 103, and the fan 12 can be disposed in the hollow area 103 to achieve the purpose of simplifying the structural design and saving the configuration space.

As shown in FIG. 1, the dissipation module 100 further includes a heat dissipation fin 140, wherein the heat dissipation fin 140 is disposed corresponding to the air outlet 12a of the fan 12, and thermally coupled to the second pipe 122. Specifically, the second pipe 122 can transfer the heat released from the working fluid to the heat dissipation fin 140 to increase the heat exchange area.

In the embodiment, the vapor chamber 110 can diffuse heat outward from the evaporating area 112 through the liquid-gas two-phase change of the working fluid to prevent heat concentration. In addition, the vapor chamber 110 can dissipate part of the heat to the communicating pipe 120, that is, the communicating pipe 120 receives part of the gaseous working fluid 101 from the vapor chamber 110. Furthermore, the gaseous working fluid 101 can undergo a gas-liquid two-phase change in the communicating pipe 120 to convert it into a liquid working fluid 101, so that the released heat can be discharged from the communicating pipe 120. Therefore, the dissipation module 100 can accelerate the gas-liquid two-phase change process of the working fluid to improve heat dissipation performance.

Figure 2:
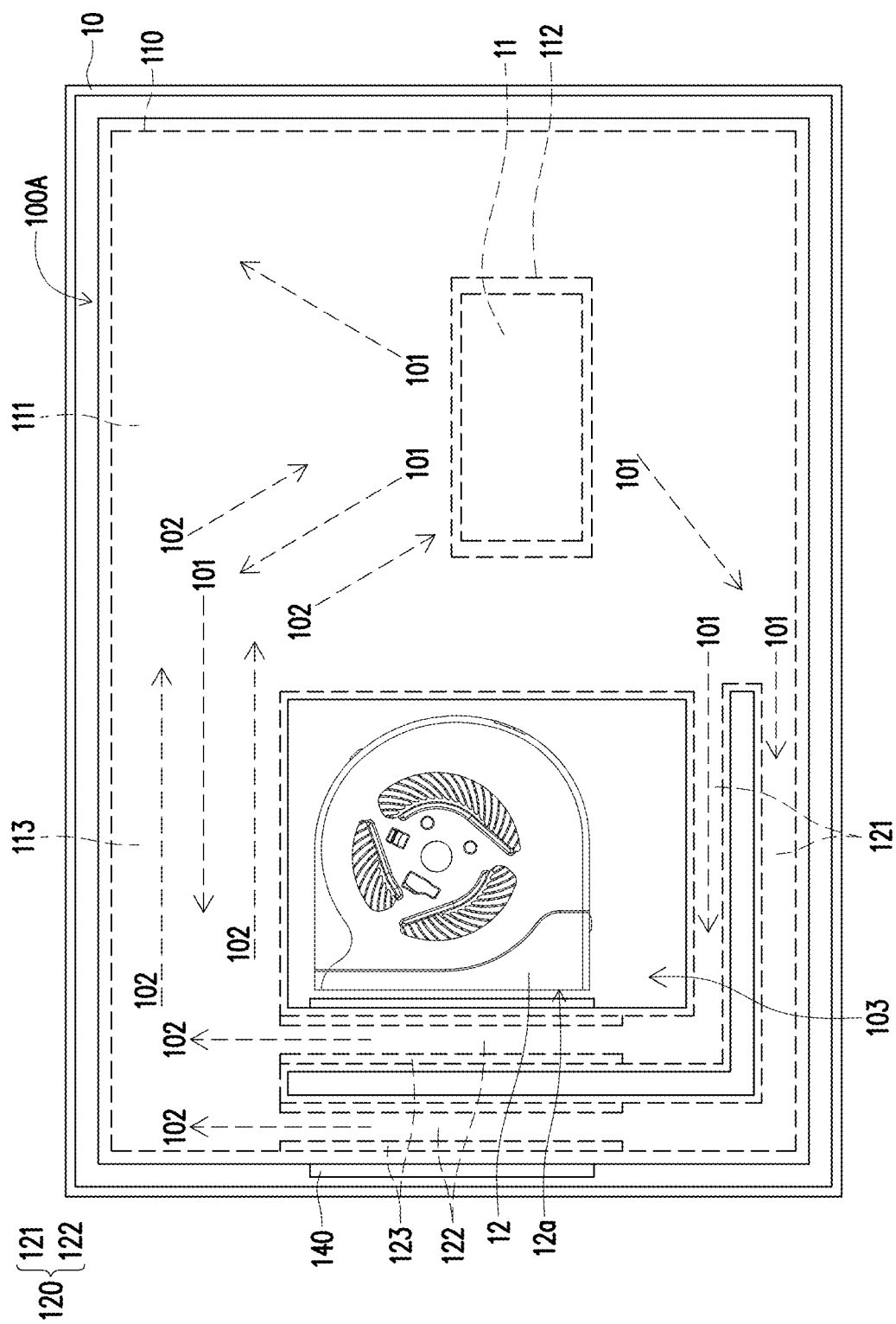
FIG. 2 is a schematic diagram of a heat dissipation module according to a second embodiment of the present invention.

FIG. 2 is a schematic diagram of a heat dissipation module according to a second embodiment of the present invention. Referring to FIG. 2, the dissipation module 100A of the embodiment is also applicable to the electronic device 10, and its design is substantially the same as that of the dissipation module 100 of the first embodiment, the main differences between the two are: In the embodiment, the number of the communicating pipe 120 is two, and the two communicating pipes 120 are disposed side by side. Therefore, the gaseous working fluid 101 can be diverted to the two communicating pipes 120, and condensed in the two communicating pipes 120 to form the liquid working fluid 102, and finally confluent in the second cavity 113.

Figure 3:
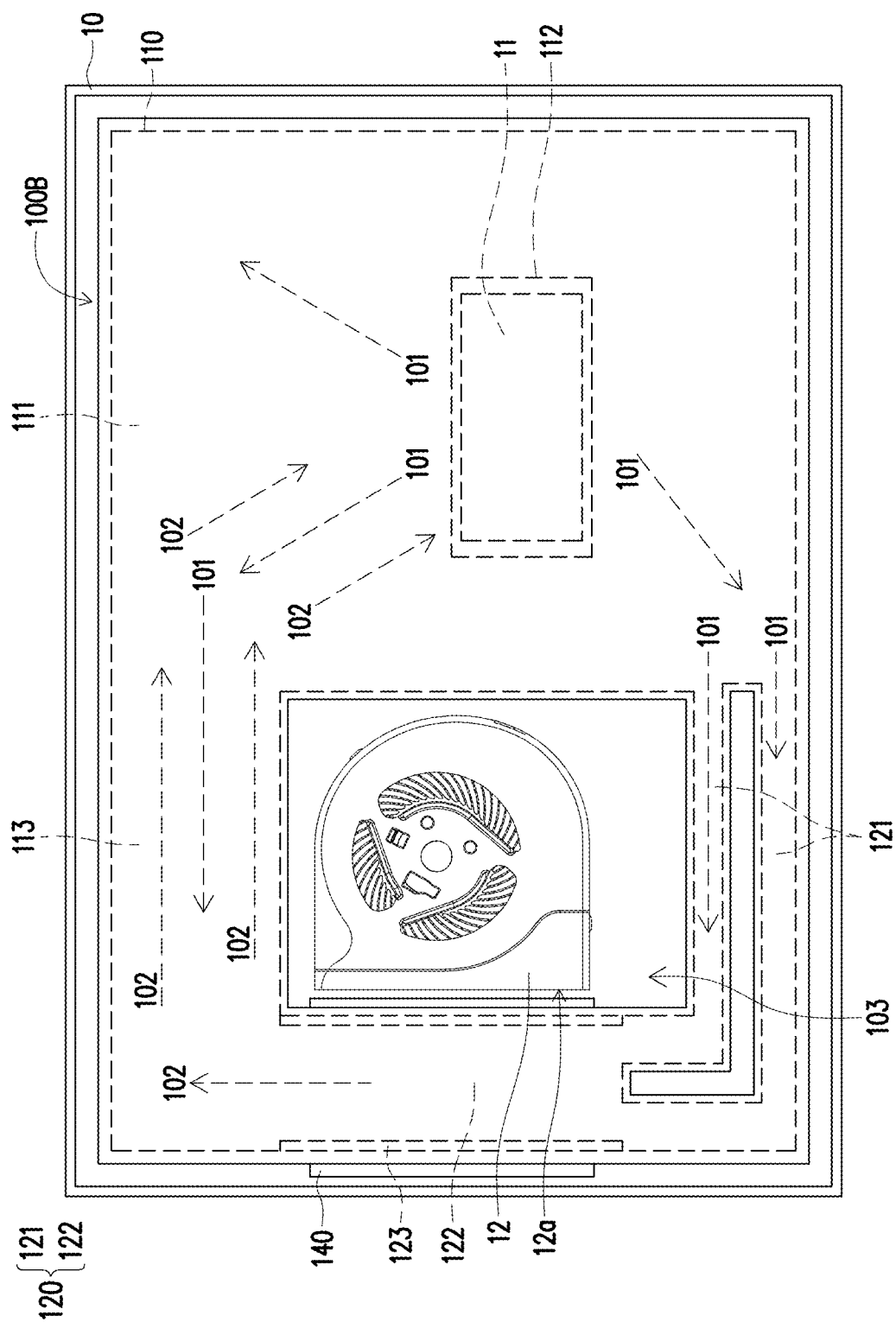
FIG. 3 is a schematic diagram of a heat dissipation module according to a third embodiment of the present invention.

FIG. 3 is a schematic diagram of a heat dissipation module according to a third embodiment of the present invention. Referring to FIG. 3, the dissipation module 100B of the embodiment is also applicable to the electronic device 10, and its design is substantially the same as that of the dissipation module 100 of the first embodiment, the main differences between the two are: In the embodiment, the number of the first pipe 121 is two, and the two first pipes 121 are disposed side by side. Besides, the two first pipes 121 are communicated with the second pipe 122. Therefore, the gaseous working fluid 101 can be diverted to the two first pipes 121 and converged to the second pipe 122. Then, the gaseous working fluid 101 is exothermically condensed in the second pipe 122 into the liquid working fluid 102, and finally flows into the second cavity 113.

Figure 4:
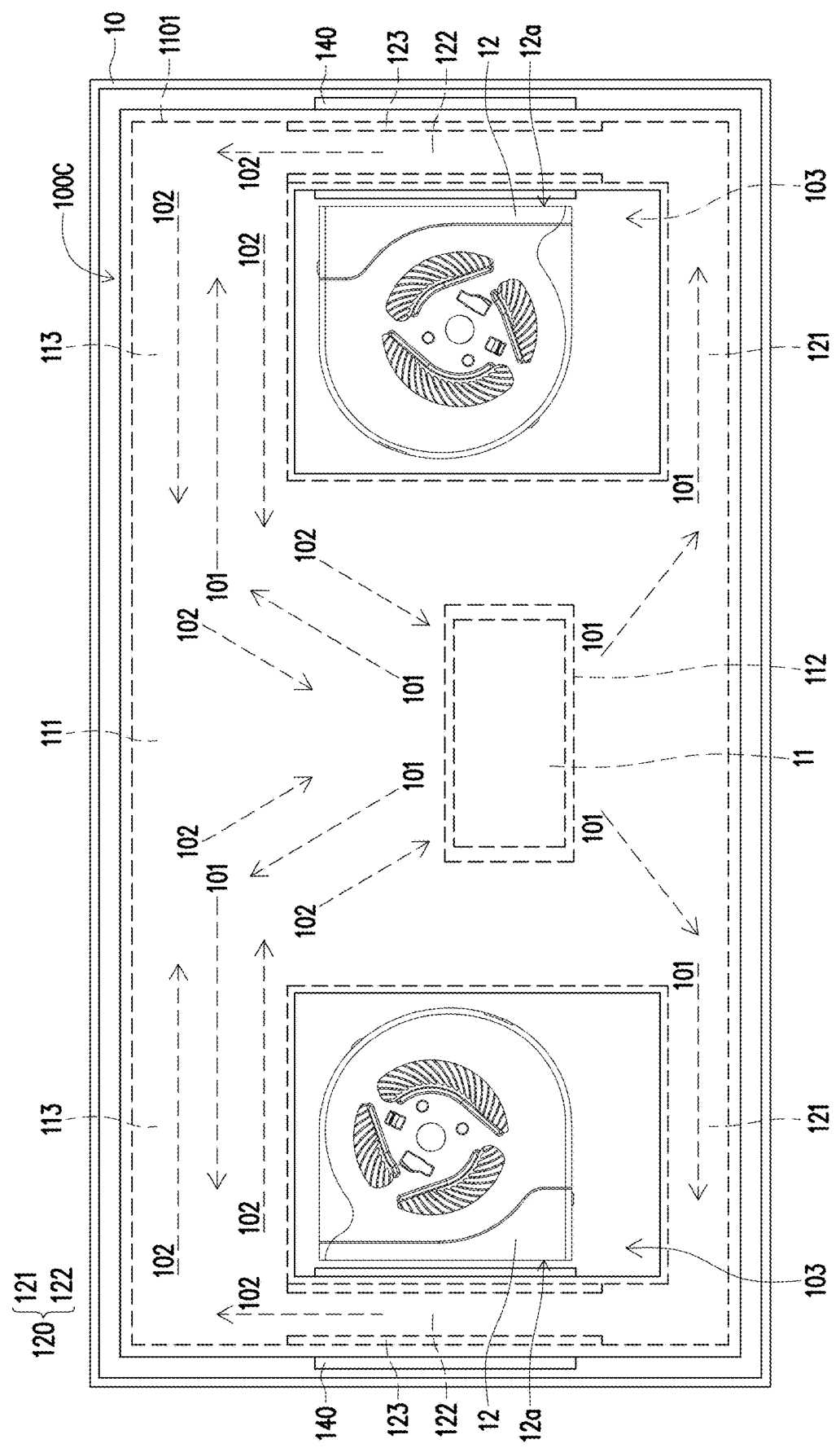
FIG. 4 is a schematic diagram of a heat dissipation module according to a fourth embodiment of the present invention.

FIG. 4 is a schematic diagram of a heat dissipation module according to a fourth embodiment of the present invention. Referring to FIG. 4, the dissipation module 100C of the embodiment is also applicable to the electronic device 10, and its design is substantially the same as that of the dissipation module 100 of the first embodiment, the main differences between the two are: In the embodiment, the vapor chamber 1101 includes the first cavity 111 and the two second cavities 113 respectively communicated with the opposite sides of the first cavity 111, and the two communicating pipes 120 are communicated with the opposite sides of the first cavity 111 respectively. In addition, the two fans 12 are respectively disposed on opposite sides of the first cavity 111, and are respectively located in the two hollow areas 103. That is to say, each of the fan 12 is surrounded by the first cavity 111, a corresponding second cavity 113 and a corresponding communicating pipe 120. Besides, each second pipe 122 of the communicating pipe 120 is provided with the heat dissipation fin 140 correspondingly.

In the embodiment, the gaseous working fluid 101 can be diverted to the two communicating pipes 120, and be exothermically condensed into the liquid working fluid 102 in the two communicating pipes 120. Then, the liquid working fluid 102 flows from the two communicating pipes 120 into the two second cavities 113 respectively, and finally converges in the first cavity 111.

In summary, the vapor chamber can diffuse heat outward from the evaporating area through the liquid-gas two-phase change of the working fluid to prevent heat concentration. In addition, the vapor chamber can dissipate part of the heat to the communicating pipe, that is, the communicating pipe receives part of the gaseous working fluid from the vapor chamber. Furthermore, the gaseous working fluid can undergo a gas-liquid two-phase change in the communicating pipe to convert it into a liquid working fluid, so that the released heat can be discharged from the communicating pipe. Therefore, the heat dissipation module can accelerate the gas-liquid two-phase change process of the working fluid to improve heat dissipation performance.

Although the present invention has been disclosed with reference to the embodiments, it is not intended to limit the present invention. Those skilled in the art may make some modifications and refinements within the spirit and scope of the present invention. Therefore, the scope of protection of the present invention shall be determined by the appended claims.

What is claimed is:

1. A heat dissipation module, adapted for an electronic device with a fan having an air outlet, comprising:
   a vapor chamber, comprises:
   a first cavity, having an evaporating area, wherein a surface of the vapor chamber corresponding to a position of the evaporating area is thermally coupled to a heat source; and
   a second cavity, communicated with the first cavity; and
   a communicating pipe, comprises:
   a first pipe, communicated with the first cavity, and an inner wall surface of the first pipe is a smooth surface; and
   a second pipe, communicated with the first pipe and the second cavity, and an inner wall surface of the second pipe is provided with a wick structure,
   wherein the first cavity, the second cavity and the communicating pipe surround and form a hollow area, and the fan is adapted for being disposed in the hollow area, and the air outlet faces the second pipe,
   wherein a first turning point is formed between the second pipe and the first pipe and a second turning point is formed between the second pipe and the second cavity, the inner wall surface of the second pipe is divided into a first part near the first turning point and a second part extending from the first part to the second turning point, the first part is a smooth surface and the wick structure is distributed on the second part, wherein the wick structure is located within a region of the second pipe facing the air outlet.

2. The heat dissipation module according to claim 1, wherein the second cavity and the first pipe are communicated on a same side of the first cavity, and the second pipe is located between the second cavity and the first pipe.

3. The heat dissipation module according to claim 1, further comprises:
   a heat dissipation fin, disposed corresponding to the air outlet of the fan and thermally coupled to the second pipe.

4. The heat dissipation module according to claim 1, wherein the number of the communicating pipe is two, and the communicating pipes are disposed side by side.

5. The heat dissipation module according to claim 1, wherein the number of the first pipe is two, and the two first pipes are disposed side by side, the two first pipes are communicated with the second pipe.

6. The heat dissipation module according to claim 1, wherein the number of the second cavity is two, and the two second cavities are communicated with the opposite sides of the first cavity respectively, the number of the communicating pipe is two, wherein the two communicating pipes are communicated with the opposite sides of the first cavity respectively and the two second cavities respectively.

7. The heat dissipation module according to claim 6, wherein the number of the fan is two, wherein one of the fans is surrounded by the first cavity, one of the communicating pipes, and one of the second cavities, and another one of the fans is surrounded by the first cavity, another one of the communicating pipes, another one of the second cavities.

8. The heat dissipation module according to claim 1, wherein the first pipe is a steam delivery pipeline, and the second pipe is a condensation pipeline.

9. The image generation device according to claim 8, wherein the second pipe is perpendicular to the first pipe.

* * * * *